United States Patent [19]

Hengesbach

[11] Patent Number: 4,569,160

[45] Date of Patent: * Feb. 11, 1986

[54] SAND BLASTING APPARATUS WITH LIQUID ASPIRATION CONTROL

[76] Inventor: Robert W. Hengesbach, 7886 Mentor Rd., Mentor, Ohio 44060

[ * ] Notice: The portion of the term of this patent subsequent to Sep. 25, 2001 has been disclaimed.

[21] Appl. No.: 529,519

[22] Filed: Sep. 6, 1983

Related U.S. Application Data

[63] Continuation-in-part of Ser. No. 388,469, Jun. 14, 1982, Pat. No. 4,473,328, and a continuation-in-part of Ser. No. 503,526, Jun. 13, 1983.

[51] Int. Cl.$^4$ ............................................. B65G 53/50
[52] U.S. Cl. ........................................ 51/427; 51/436
[58] Field of Search ................................. 51/427, 436

[56] References Cited

U.S. PATENT DOCUMENTS

| | | |
|---|---|---|
| Re. 21,391 | 3/1940 | Holden . |
| 783,218 | 2/1905 | Murray ................................. 51/436 |
| 1,036,871 | 8/1912 | Matheson . |
| 1,145,029 | 7/1915 | Munro . |
| 1,180,960 | 4/1916 | Urie et al. . |
| 1,476,810 | 12/1923 | Gilsenan . |
| 1,948,533 | 2/1934 | Neely . |
| 1,988,979 | 1/1935 | Campbell . |
| 2,072,555 | 3/1937 | Hengesbach et al. . |
| 2,125,573 | 8/1938 | Kelley, Jr. . |
| 2,133,149 | 10/1938 | Poncelet . |
| 2,176,577 | 10/1939 | Tirrell . |
| 2,293,390 | 8/1942 | Hengesbach . |
| 2,302,799 | 11/1942 | Peterson . |
| 2,310,633 | 2/1943 | Heimburger . |
| 2,577,465 | 12/1951 | Jones et al. ........................... 51/427 |
| 2,589,728 | 3/1952 | Pratt . |
| 2,659,629 | 11/1953 | Graham . |
| 2,919,073 | 12/1959 | Akselrad et al. . |

(List continued on next page.)

OTHER PUBLICATIONS

Brochure, Tri-Con, Inc., 4 pp., dated 1/1/1977, entitled: We Make the System.
Brochure, Spraying Systems Co., Catalog 27, 90 pp. 1978, entitled: Spray Nozzles and Accessories.
Brochure, Spraying Systems Co., Bulletin 179F, 8 pp., 1971, entitled: Spray Nozzles, Spray Guns, Valves and Accessories.
Brochure, Tri-Con, Inc., 2 pp., dated 11/1/1982, entitled: User Price List (See Item No. 700).

*Primary Examiner*—James G. Smith
*Assistant Examiner*—J. T. Zatarga
*Attorney, Agent, or Firm*—David A. Burge

[57] ABSTRACT

A sand blasting apparatus utilizes an aspiration system (1) to draw particulate media such as sand and a carrier gas such as air into a mixing chamber of a discharge nozzle through an aspiration probe and through a media supply conduit from a media reservoir, (2) to draw a liquid such as water into the mixing chamber through a liquid supply conduit from a liquid reservoir, and (3) to combine the liquid, the media and the carrier gas with a propulsion fluid such as compressed air so that what discharges from the nozzle is a controlled, uniformly combined flow of media, carrier gas, liquid and propulsion fluid. The aspiration effect needed to draw the media, the carrier gas and the liquid into the discharge nozzle is achieved by passing a flow of propulsion fluid along a flow path through the mixing chamber. The combined flow which discharges from the nozzle provides an enhanced blasting action. The presence of the liquid in the discharging flow diminishes the tendency of clouds of dust to form as tends to occur if dry media alone is used in a blasting operation. The apparatus utilizes a particularly advantageous type of aspiration probe which is inserted into the media reservoir for delivering a flow of media and carrier gas to the media supply conduit. The media probe has a tube-within-a-tube construction with an inner media supply tube being surrounded, at least in part, by an outer carrier gas supply tube. A flow control regulator is provided to enable the flow rate at which liquid is delivered from the liquid reservoir to the nozzle to be preset and/or controlled so that the relative percentages of media and liquid in the discharging flow can be adjusted for optimum performance.

20 Claims, 9 Drawing Figures

U.S. PATENT DOCUMENTS

| | | | |
|---|---|---|---|
| 2,938,534 | 5/1960 | Bos. | |
| 3,032,929 | 5/1962 | Glesener | 51/427 |
| 3,131,834 | 5/1964 | Meshberg. | |
| 3,181,737 | 5/1965 | Chaucer. | |
| 3,388,838 | 6/1968 | Marchant. | |
| 3,416,844 | 12/1968 | Steidley | 51/427 |
| 3,577,681 | 5/1971 | Waag | 51/427 |
| 3,632,046 | 1/1972 | Hengesbach. | |
| 3,711,028 | 1/1973 | Hengesbach. | |
| 3,727,841 | 4/1973 | Hengesbach. | |
| 3,756,273 | 6/1973 | Hengesbach. | |
| 4,035,004 | 7/1977 | Hengesbach. | |
| 4,369,607 | 1/1983 | Bruggeman | 51/427 |
| 4,449,696 | 5/1984 | Hengesbach. | |
| 4,471,911 | 9/1984 | Hengesbach. | |
| 4,473,328 | 9/1984 | Hengesbach. | |
| 4,494,699 | 1/1985 | Hengesbach. | |

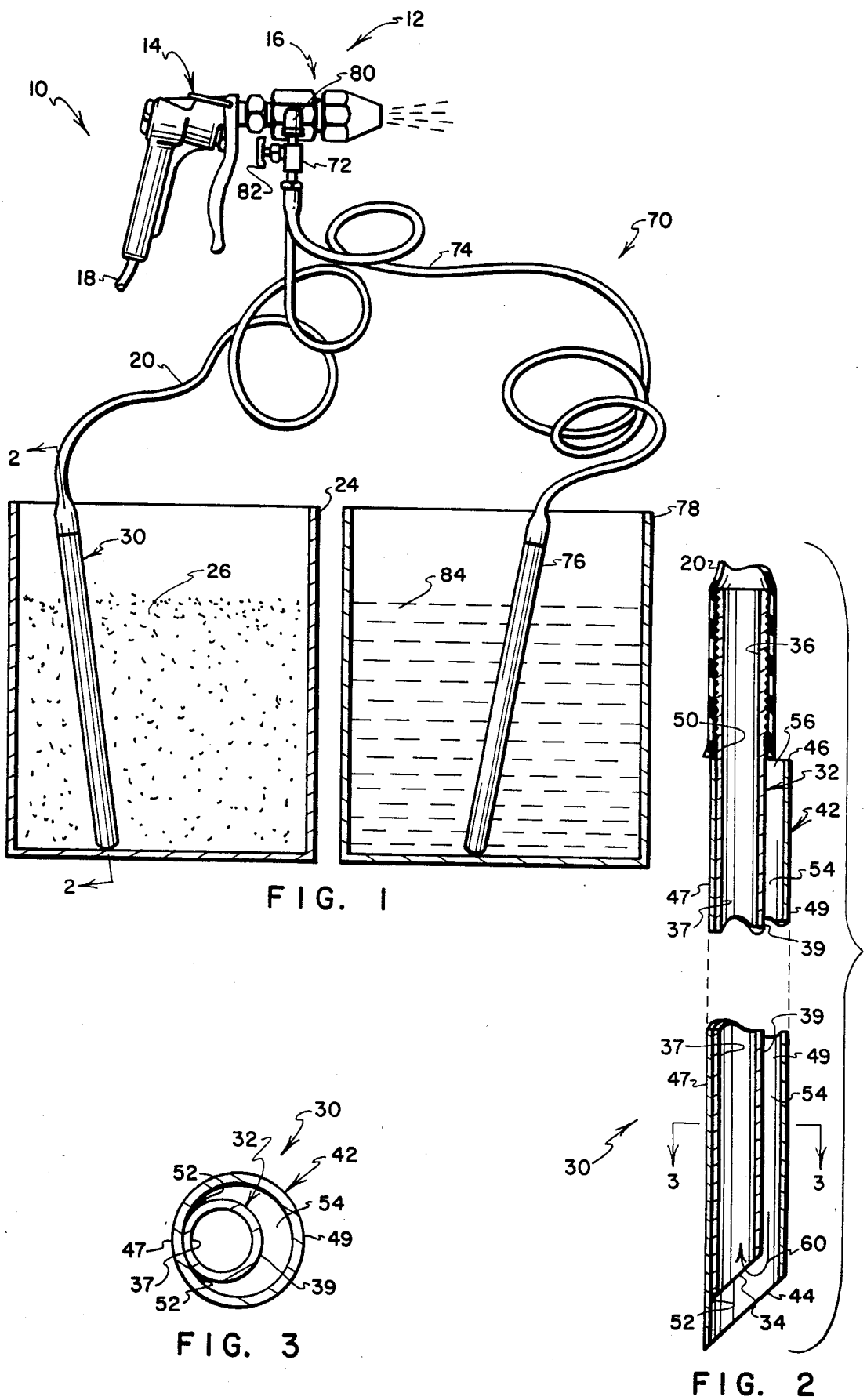

SAND BLASTING APPARATUS WITH LIQUID ASPIRATION CONTROL

CROSS REFERENCE TO RELATED APPLICATIONS

The present application is a continuation-in-part of application Ser. No. 388,469, filed June 14, 1982, by Robert W. Hengesbach, issued Sept. 25, 1984, as U.S. Pat. No. 4,473,328, entitled ASPIRATOR PROBE FOR SAND BLASTING APPARATUS, hereinafter referred to as the "Aspirator Probe Case," the disclosure of which is incorporated herein by reference.

The present application is also a continuation-in-part of application Ser. No. 503,526 filed June 13, 1983, by Robert W. Hengesbach, entitled CONVERTIBLE SAND BLASTING APPARATUS, hereinafter referred to as the "Canister Probe Case," the disclosure of which is incorporated herein by reference.

BACKGROUND OF THE INVENTION

1. Field of the Invention

The present invention relates to sand blasting apparatus and the like, and, more particularly, to an aspiration-type sand blasting apparatus which utilizes an improved aspirator probe for ducting media and carrier gas from a media reservoir through a media supply conduit to the mixing chamber of a discharge nozzle, which provides for a controlled flow of liquid from a liquid reservoir through a liquid supply conduit to the mixing chamber, and which causes the media, the carrier gas and the liquid to combine with a propulsion fluid in the mixing chamber for discharge from the nozzle.

2. Prior Art

It is known to provide a portable sand blasting apparatus with a media aspirator probe which can be inserted into a reservoir of flowable blasting media, such as granular sand, for supplying a mixture of media and a carrier gas, such as air, through a supply conduit, to a discharge control nozzle. The nozzle is supplied with pressurized propulsion fluid, such as compressed air, which is caused to flow through the nozzle. The propulsion fluid travels along a flow path that extends substantially centrally through a mixing chamber defined within the nozzle. The propulsion fluid operates, as by aspiration, to draw a vacuum in the media supply conduit and in the media probe, whereby ambient air pressure causes media and a carrier gas, namely air, to move through the probe and through the media supply hose to the nozzle. The mixture of media and carrier gas is introduced into the flow of propulsion fluid. A forceful delivery of the media, the carrier gas and the propulsion fluid discharges from the nozzle in a controlled direction for treating workpiece surfaces.

As is discussed in introductory portions of the referenced Aspirator Probe Case, a previously proposed aspirator probe construction includes two parallel tubes of unequal length positioned side-by-side and welded together. The probe is oriented substantially vertically with lower ends of both tubes extending into a supply of flowable blasting media such as granular sand. One of the tubes is longer than the other, and its upper end projects upwardly beyond the upper end of the shorter tube. The lower ends of both tubes are coextensive. The longer of the tubes is a delivery tube for supplying a mixture of sand and air through a supply hose to a control nozzle. The shorter of the tubes is an air supply tube. Aligned holes are drilled through adjacent walls of the delivery and air supply tubes to provide a port which communicates both of the tubes. When the discharge control nozzle is activated, pressurized propulsion fluid passing through the nozzle creates an aspiration effect which draws a vacuum in the media supply hose and in the delivery tube of the probe. Ambient air pressure operates on sand in the container to force sand into and through the delivery tube, and through the supply hose to the control nozzle. As sand rises in the delivery tube, an additional aspiration effect operating in the probe causes air to be drawn into the delivery tube from the air supply tube through the communicating port. The air which is drawn into the delivery tube mixes with the sand to provide a sand and air mixture that is supplied to the control nozzle. The aspiration effect which operates within the probe provides a means of metering sand and air for supply to the control nozzle. Since aspiration takes place within the probe, the probe is known in the art as an aspirator probe.

A problem with the above-described aspirator probe proposal is that the operation of the probe tends to change undesirably with variations in the pressure of the propulsion fluid which is supplied to the control nozzle. A further problem lies in a pulsating, relatively uneven delivery of sand which occasionally results with use of the probe. Another problem is that, in order to drill a communicating hole through abutting walls of the side-by-side delivery and air supply tubes, it is necessary to drill an additional hole through the opposite wall of one of the tubes in order to gain access to the area where a hole can be drilled through abutting walls of the two tubes. The drilling of this additional hole adds to fabrication cost. The presence of this additional hole is also found, in some instances, to detract from proper operation or the probe.

A further problem with prior sand blast apparatus proposals is that undesirable clouds of dust may tend to be generated not only as the dry media discharges from the nozzle but also as the dry media travels through the air and impacts a surface being blasted. Some prior proposals have attempted to overcome this problem by introducing a flow of liquid into the discharging stream of media, carrier gas and propulsion fluid. A problem with prior liquid injection proposals lies in the non-uniformity of the relative percentages of media and liquid in the mixtures which discharge from the nozzles. This non-uniformity results, at least in part, from the pulsating, relatively uneven delivery of media provided by the previously described aspiration probes. Still another drawback common to most prior liquid injection proposals is their failures to provide a control for regulating the relative percentages of liquid and media in the flow which discharges from the nozzle.

3. The Referenced Applications

The invention of the referenced Aspirator Probe Case addresses the problem of providing an improved aspirator probe by providing an improved probe having a tube-within-a-tube construction that utilizes a mixture delivery tube which is surrounded along a majority of its length by an air supply tube. In preferred practice, the air supply tube has an inner diameter that is larger than the outer diameter of the delivery tube. The delivery tube is longer than the air supply tube and has an upper end which projects upwardly beyond the upper end of the air supply tube for connection to a delivery hose. The delivery tube has a lower end which is either coextensive with or recessed within the lower end of the air supply tube. A communicating formation is provided for permitting a restricted flow of air to pass from the air supply tube into the delivery tube.

One probe embodiment described in the referenced Aspirator Probe Case utilizes a communicating formation which takes the form of a non-coextensive arrangement of the lower ends of the delivery and air supply tubes. In another described embodiment, the communicating formation takes the form of a hole, slot, notch or the like, provided in a side wall portion of the delivery tube. In still another described embodiment the communicating formation takes the form of a notch or relief provided on the lower end of the delivery tube.

The present invention preferably utilizes the invention of the referenced Aspirator Probe Case in combination with a system for providing a controlled flow of liquid to a discharge control nozzle so that what discharges from the nozzle is an optimum controlled flow of media, carrier gas, liquid and propulsion fluid.

The invention of the referenced Canister Probe Case provides a means for utilizing aspirator probes of the type described in the referenced Aspirator Probe Case both (1) in the environment of a canister-type sand blast apparatus and (2) in the environment of a remote-reservoir-type sand blast apparatus of the type described previously (i.e., wherein a media supply hose connects a discharge control nozzle with an aspirator probe which is positioned in a remotely located media reservoir). In a canister-type sand blast apparatus, a canister containing granular media is connected by means of a relatively short supply conduit to a discharge control nozzle. In preferred practice wherein a canister-type reservoir is used, the supply conduit provides a rigid connection that supports the media canister from the body of the discharge control nozzle.

SUMMARY OF THE INVENTION

The present invention overcomes the previously described and other drawbacks of prior proposals by providing a sand blast apparatus which utilizes, in combination, an aspirator probe of the type which forms the subject of the referenced Aspirator Probe Case together with a liquid aspiration system which provides a controlled introduction of liquid into a mixing chamber of a discharge nozzle. By this arrangement what discharges from the nozzle is an optimum combined flow of media, carrier gas, liquid and propulsion fluid. In some instances, an additional liquid may be substituted for the media, whereby the apparatus of the present invention may be utilized to mix and apply liquids which are delivered to the mixing chamber from separate reservoirs. For example, a pair of canisters may serve as reservoirs for two liquids which, when mixed and applied, provide a hardened epoxy coating.

The present invention can utilize a canister of the general type described in the referenced Canister Probe Case to serve as the media reservoir or as the liquid reservoir. Moreover, the tube-within-a-tube type aspirator probes which are described in the referenced applications may be utilized to feed uniform flows of carrier gas and liquid and/or carrier gas and media to the discharge control nozzle.

In accordance with the preferred practice of the present invention, a sand blast apparatus utilizes an aspiration system (1) to draw particulate media, such as sand, and a carrier gas, such as air, into a mixing chamber of a discharge nozzle through an aspiration probe and through a media supply conduit from a media reservoir, (2) to draw a liquid such as water into the mixing chamber through a liquid supply conduit from a liquid reservoir, and (3) to combine the liquid, the media and the carrier gas with a propulsion fluid such as compressed air so that what discharges from the nozzle is a controlled, uniformly combined flow of media, carrier gas, liquid and propulsion fluid. The aspiration effect needed to draw the media, the carrier gas and the liquid into the discharge nozzle is achieved by passing a flow of propulsion fluid along a flow path through the mixing chamber. The combined flow which discharges from the nozzle provides an enhanced blasting action. The presence of the liquid in the discharging flow diminishes the tendency of clouds of dust to form as tends to occur if dry media alone is used in a blasting operation. The apparatus utilizes a particularly advantageous type of aspiration probe which is inserted into the media reservoir for delivering media and carrier gas into the first supply conduit. A flow control regulator is provided to enable the flow rate at which liquid is delivered from the liquid reservoir to the nozzle to be pre-set and/or controlled so that the relative percentages of media and liquid in the discharging flow can be adjusted for optimum performance.

The media probe is preferably of the tube-within-a-tube type that forms the subject matter of the referenced Aspirator Probe Case. In preferred practice the media probe includes a delivery tube and an air supply tube. The delivery tube is longer than the air supply tube and has an upper end which projects upwardly beyond the upper end of the air supply tube for connection to a media supply conduit. The delivery tube has a lower end which is either coextensive with or recessed within the lower end of the air supply tube. A communicating formation is provided for permitting a restricted flow of air to pass from the air supply tube into the delivery tube. In a preferred embodiment the communicating formation takes the form of a non-coextensive arrangement of the lower ends of the delivery and supply tubes.

A feature of the present invention lies in the provision of a sand blast apparatus wherein the construction and operation of the media probe substantially reduces the pulsating, relatively uneven delivery of media which occurs with the use of prior probe proposals. The probe provides a regulated, uniform and reliable flow of media and carrier gas to the discharge nozzle of the sand blasting apparatus.

Another feature lies in the utilization of a single aspiration system to draw controlled flows of media, carrier gas and liquid into the discharge nozzle, where the media, the carrier gas and the liquid are combined with a flow of propulsion fluid to establish the combined flow which discharges from the nozzle. No pump or other auxiliary media or liquid delivery mechanism is needed to deliver both media and liquid to the discharge control nozzle.

BRIEF DESCRIPTION OF THE DRAWINGS

The foregoing and other features of the present invention will be better understood by referring to the description of the preferred embodiment and claims which follow, taken together with the accompanying drawings, wherein:

FIG. 1 is a side elevational view of a sand blasting apparatus which embodies features of the present invention, including a media probe being shown as inserted into a media reservoir, and a liquid probe being shown inserted into a liquid reservoir, with the reservoirs being shown somewhat schematically and in cross section;

FIG. 2 is a sectional view of the media probe, on an enlarged scale, as seen from a plane indicated by a line 2—2 in FIG. 1;

FIG. 3 is a sectional view, on an enlarged scale, as seen from a plane indicated by a line 3—3 in FIG. 2;

DESCRIPTION OF THE PREFERRED EMBODIMENT

Figure 4:
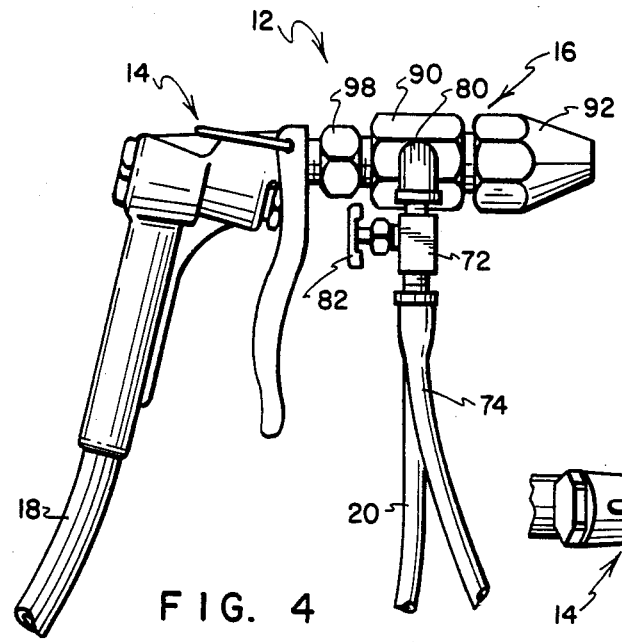
FIG. 4 is a side elevational view, on an enlarged scale, of portions of the sand blasting apparatus.
Figure 5:
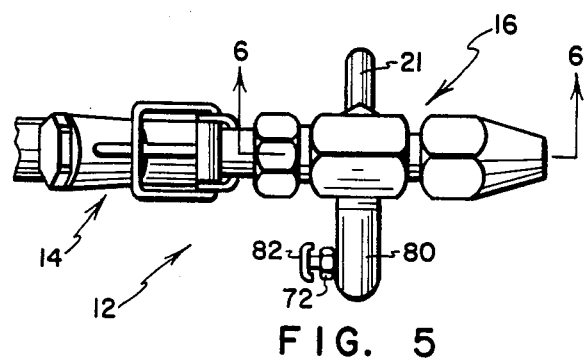
FIG. 5 is a top plan view thereof.

Referring to FIG. 1, one form of a sand blast apparatus embodying features of the present invention is indicated generally by the numeral 10. The apparatus 10 includes a discharge control nozzle indicated generally by the numeral 12. The control nozzle 12 includes a conventional trigger-operated control valve 14 of the general type described in U.S. Pat. Nos. 3,756,273, 3,632,046 and 2,072,555, the disclosures of which are incorporated herein by reference. The control nozzle 12 additionally includes an aspiration-type sand blast nozzle assembly 16 which can take any of a variety of commercially available forms, one being a nozzle assembly sold under the model designation 710 by Tri-Con, Inc., Cleveland, Ohio 44132. While the internal configuration of the nozzle assembly 16 is well known to those skilled in the art and forms no part of the present invention, its internal configuration is depicted in cross section in FIG. 6 and is described below.

Figure 7:
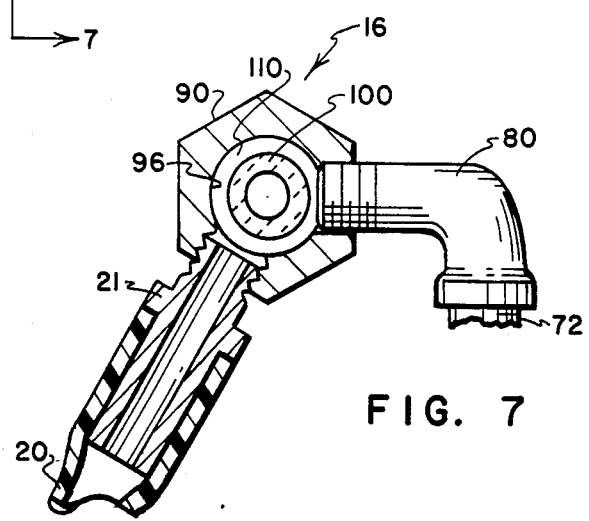

A supply hose 18 connects with the control valve 14 for supplying pressurized propulsion fluid, such as pressurized air, to the control valve 14. A media supply conduit in the form of a hose 20 connects with the nozzle assembly 16 for delivering a mixture of a flowable media, such as granular sand, and a carrier gas, such as ambient air, to the nozzle assembly 16. In preferred practice, one end of the media supply hose 20 extends over and frictionally engages the outer wall of an inlet fitting 21, as is best seen in FIG. 7.

A first open-top container 24 is provided as a media reservoir to contain a supply of flowable media such as granular sand 26. A media aspirator probe 30 is positioned to extend into the sand supply 26. The probe 30 connects with the media supply hose 20 and serves to provide a regulated mixture of sand and a carrier gas, namely ambient air, in a manner which will be described. While the container 24 is shown as taking the form of a barrel-like structure, it will be understood that the container 24 can take substantially any form which defines a suitable reservoir for sand or other flowable media such as granular or particulate abrasive materials and/or fluid medias which are to be supplied by aspiration to the nozzle assembly 16 for use instead of or together with granular sand.

The media aspirator probe 30 is a preferred embodiment of several tube-within-a-tube type media aspirator probe embodiments which are described in detail in the referenced Aspirator Probe Case. Any of the several tube-within-a-tube type aspirator probe configurations which form the subject matter of the Aspirator Probe Case may be substituted for the probe 30. The configuration of the tube-within-a-tube media probe 30 which is described herein represents the most preferred embodiment in view of its simplicity and ease of construction.

In use, the probe 30 is normaly oriented in a generally vertically extending direction, as is depicted in FIG. 1. Referring to FIGS. 2 and 3, the probe 30 includes an inner, mixture delivery tube 32, and an outer air supply tube 42. The tubes 32, 42 have lower ends 34, 44 which are inclined and extend in spaced parallel planes. The lower end 44 of the delivery tube 32 is recessed inside the lower end 34 of the supply tube 42. The delivery tube 32 is longer than the air supply tube 42 and has an upper end region 36 which extends upwardly beyond the upper end 46 of the air supply tube 42. The media supply hose 20 has one of its ends stretched to extend over and sealingly engage the upper end region 36 of delivery tube 32.

The mixture delivery tube 32 has opposed left and right longitudinally-extending side wall portions which are designated by the numerals 37, 39. The air supply tube 42 has opposed left and right longitudinally-extending side wall portions which are designated by the numerals 47, 49. The left side wall portion 37 of the mixture delivery tube 32 abuttingly engages the left side wall portion 47 of the air supply tube 42. Upper and lower bonds 50, 52 formed by welding or other suitable joining techniques are located at the upper and lower ends of the left side wall portion 47 and serve to rigidly connect the tubes 32, 42.

The right side wall portions 39, 49 are spaced from each other by virtue of the relative differences in diameters of the tubes 32, 42. The space between the side wall portions 39, 49 defines an air supply passage 54 of generally horseshoeshaped cross section, as is best seen in FIG. 3. The passage 54 has an open upper end 56 for admitting ambient air into the passage 54.

The non-coextensive arrangement of the lower ends 34, 44 provides a communicating passage, indicated generally by the arrow 60, which permits the passage of a restricted flow of air from the air supply tube 42 into the delivery tube 32 as sand is being drawn through the delivery tube 32 during activation of the control valve 14. The rate of flow of ambient air from the air supply tube 42 to the delivery tube 32 along the path indicated by the arrow 60 is determined, at least in part, by the extent of an aspiration effect which is created by the flow of sand through the delivery tube 32 past the lower end of the air supply tube 42. It is probably also determined, at least in part, by the characteristics of the sand or other flowable media being introduced into the delivery tube 32, and by the type of turbulent and/or laminar flows which take place as sand and air mix and enter the lower end 34 of the delivery tube 32. By this arrangement, the media probe 30 serves to provide a properly metered mixture of media, in this case sand, and carrier gas, in this case ambient air, for delivery to the nozzle assembly 16 through the media supply hose 20.

As described thus far, the sand blasting apparatus 10 is functionally and structurally identical to one of several sand blasting system embodiments described in the referenced Aspirator Probe Case. In order to incorporate features of the present invention, the apparatus 10 is provided with a system for introducing a controlled flow of liquid into the discharge control nozzle 16 for mixture with the media and carrier gas that is supplied by the hose 20, and for mixing with propulsion fluid supplied by the hose 18, whereby, what discharges from the nozzle 16 as a flow 24 (see FIG. 1) is a mixture of media, carrier gas, liquid and propulsion fluid.

Referring again to FIG. 1, a liquid delivery system is indicated generally by the numeral 70. The liquid delivery system 70 includes a liquid flow regulator valve 72, a liquid supply conduit in the form of a hose 74, and a probe 76 which extends into a liquid reservoir 78. The flow regulator valve 72 is connected by a street ell-type of fitting 80 to the control nozzle 16, and by a suitable fitting 82 to the liquid supply hose 74. The valve 72 serves to control the delivery of liquid such as water to the nozzle assembly 16, and to adjust the relative percentages of media and liquid which discharge in the mixture 24. The valve 72 is provided with a rotatable control knob 82 which is used to meter the flow of liquid from the reservoir 78 to the nozzle assembly 16.

While the liquid reservoir 78 is depicted as taking the form of a barrel-like structure, it will be understood that the container 78 can take substantially any form which defines a suitable reservoir for liquid such as water 84. The liquid probe 76 is positioned to extend into the supply of liquid 84. While the probe 76 is illustrated as taking the form of the aspirator probe 30, the use of an aspirator probe is not ordinarily required to properly draw most liquids into the hose 74, whereby the probe 76 may take the form of a simple elongate tubular structure which connects to the liquid supply hose 74, or may, in many instances, be eliminated by extending the hose 74 into the liquid 84.

Figure 6:
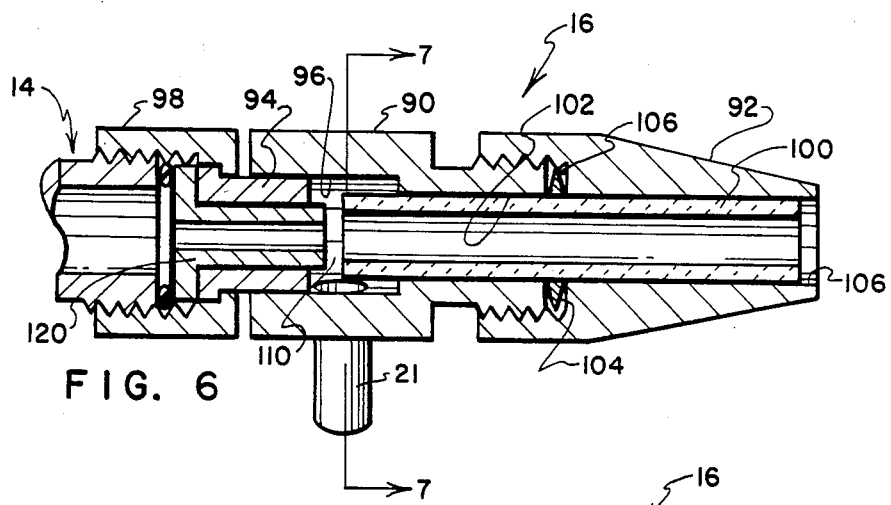
FIGS. 6 and 7 are sectional views, on an enlarged scale, as seen from planes indicated by lines 6—6 and 7—7 in FIGS. 5 and 6, respectively.

Referring to FIGS. 4 and 6, the nozzle assembly 16 includes a central body 90. A retaining nut 92 is carried on the right end region of the body 90. Referring to FIG. 6, a shoulder bushing 94 is pressed into a passage 96 which is formed in the left end of the body 90. A connector nut 98 is carried on the shoulder bushing 94 for threadably engaging the discharge conduit of the control valve 14. A discharge tube 100 formed from a ceramic or other suitably hard material is positioned in a passage 102 which opens through the right end of the body 90. The discharge tube 100 carries a retainer ring 104 which is clamped between the right end of the body 90 and a shoulder 106 formed inside the nut 92. The discharge tube 100 extends into a passage 106 formed centrally through the nut 92.

A mixing chamber 110 is defined within the passage 96 and extends about the left end region of the discharge tube 100. The media supply fitting 21 and the liquid supply fitting 80 are threaded into holes formed in the body 90 and communicate with the mixing chamber 110, as is best seen in FIG. 7. An insert bushing 120 is provided to extend through the shoulder bushing 94 to duct propulsion fluid into the mixing chamber 110 along a path of flow which will direct propulsion fluid substantially centrally through the chamber 110 and into the discharge tube 100.

The relative inner diameters and configurations of the bushing 94, the mixing chamber 110 and the discharge tube 100 are such that an aspiration effect is created as propulsion fluid flows through the mixing chamber 110. When the control valve 14 is activated, pressurized propulsion fluid from the supply hose 18 is delivered by the control valve 14 to the nozzle assembly 16. As the propulsion fluid passes from the small diameter passage of the bushing 120 through the chamber 110 into the larger diameter discharge passage of the discharge tube 100, an aspiration effect is created which draws a vacuum within the mixing chamber 110 and in the hoses 20, 74. As vacuums are drawn in the hoses 20, 74, ambient air pressure causes materials to be supplied to the nozzle 12 through the supply hoses 20, 74. The aspiration effect causes such liquid as is supplied to the chamber 110 through the hose 74 to be uniformly mixed with such sand and air as is introduced into the mixing chamber 110 from the hose 20, and for these materials to mix with the flow of propulsion fluid for discharge in a controlled direction, as is indicated by the numeral 24 in FIG. 1.

A feature of the apparatus 10 is that the valve 72 provides a means for regulating the flow of liquid into the chamber 110 so that the relative percentages of liquid and media in the discharging flow 24 can be controlled to provide an optimum blasting action with minimal attendant discharge of dust. By utilizing the highly reliable media probe 30 in combination with the liquid delivery system 70, uniform flows of media, carrier gas and liquid are introduced into the mixing chamber 110 in a controlled manner that assures optimum performance of the blasting apparatus 10.

Figure 8:
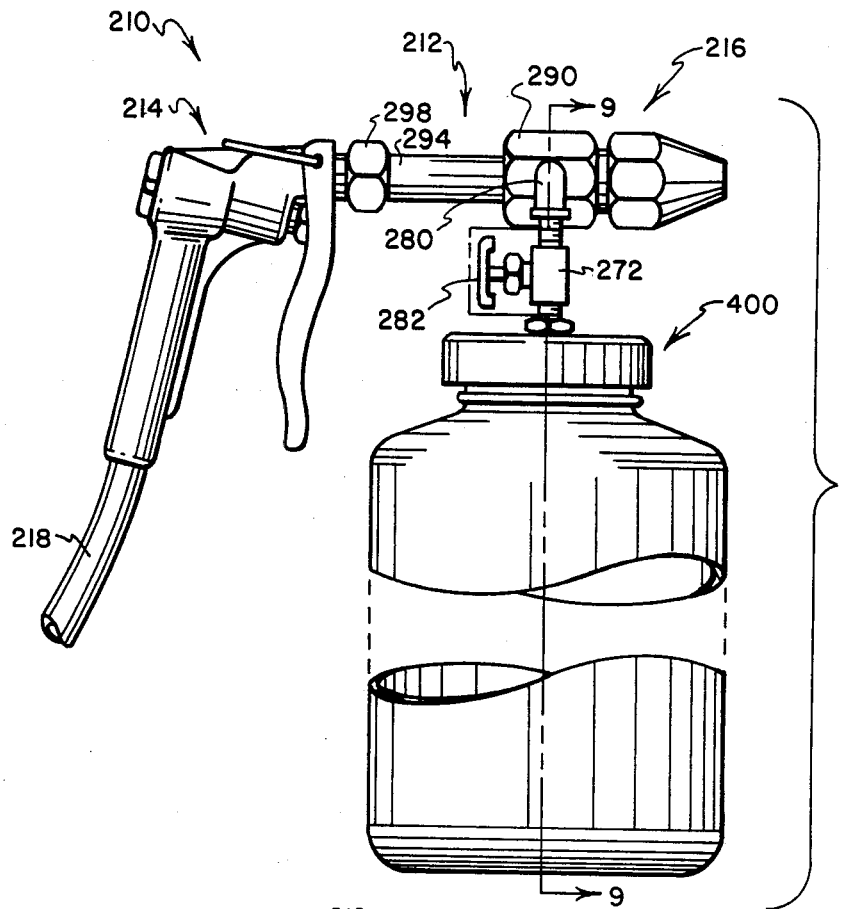
FIG. 8 is a side elevational view similar to FIG. 4 but showing an alternate, canister-type embodiment of the invention; and, FIG. 9 is primarily a sectional view as seen from a plane indicated by a broken line 9—9 in FIG. 8.
Figure 9:
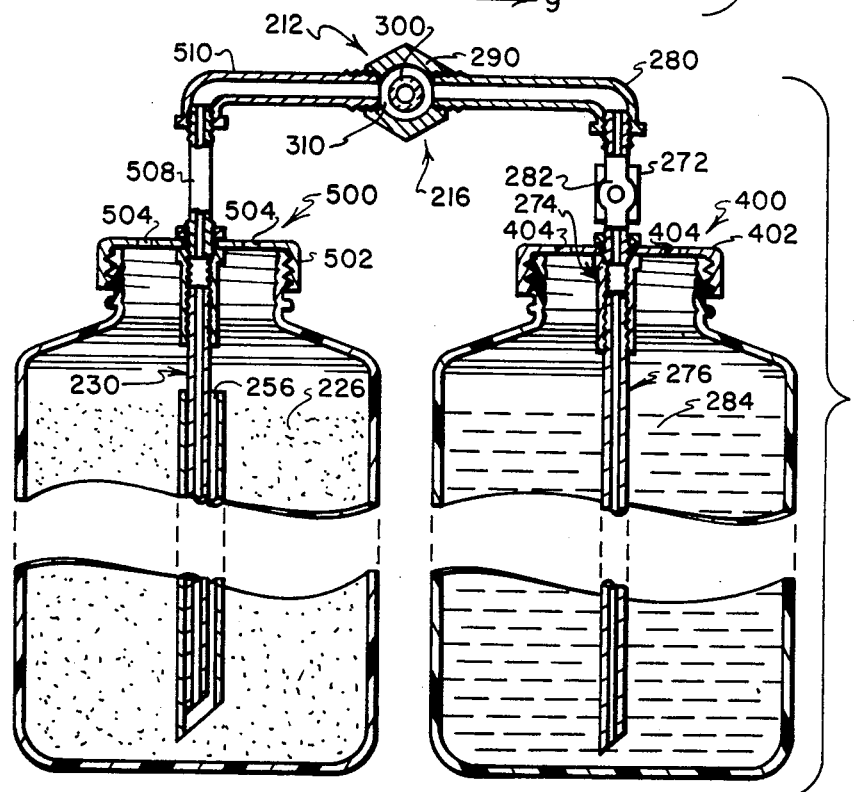

Referring to FIGS. 8 and 9, a canister-type embodiment of sand blast apparatus is indicated generally by the numeral 210. The apparatus 210 includes a discharge control nozzle, indicated generally by the numeral 212. The control nozzle 212 is identical to the described nozzle 12 except in its provision of a longer shoulder bushing 294 which replaces the relatively shorter bushing 94, and in the arrangement and types of supply connections that are made between the nozzle body 290 and such supply lines as extend from a pair of canisters 400, 500. Inasmuch as the apparatuses 10, 210 have many corresponding parts which are identical except as indicated above, for simplicity these corresponding parts (which need not be further described) are indicated by numerals which differ from those used in conjunction with the embodiment of FIGS. 1–7 by a magnitude of two hundred.

Referring to FIG. 9, it will be seen that the canisters 400, 500 are arranged side by side in a substantially symmetrical arrangement beneath the nozzle 212. The canister 400 is a liquid reservoir which contains a quantity of liquid 284. The canister 500 is a media reservoir which contains a quantity of media 226. A liquid delivery system includes a flow regulator valve 272 and a liquid supply conduit assembly 274 which extends through a lid 402 of the canister 400 to connect the valve 272 with a probe 276. While the probe 276 is depicted as taking the form of a simple section of elongate tubing, it will be understood that tube-within-a-tube probes of the type described in the referenced Canister Probe Case (e.g., the probe 30 described previously herein) can be substituted if what is desired to be supplied from the canister 400 is a mixture of liquid and carrier gas such as ambient air. The probe 276 extends into the liquid 284 for ducting liquid through the supply conduit 274 to the valve 272. The flow regulator valve 272 is connected by a street ell-type of fitting 280 to the control nozzle 212. The valve 272 serves to control the delivery of liquid 284, such as water, oil or another appropriate liquid, from the reservoir of the canister 400 to the nozzle assembly 216, and to adjust the relative percentages of the media and liquid which discharge in a mixture issuing from the nozzle 216. The valve 272 is provided with a rotatable control knob 282 which is used to meter the flow of liquid 284 from the canister 400 to the nozzle 212.

As will be apparent to those skilled in the art, the liquid supply system utilized in the embodiment of FIGS. 8 and 9 operates substantially identically to that of the previously described embodiment except that the liquid 284 is housed within a canister 400 that is attached directly to the nozzle 212 rather than being remotely located and connected as by a supply hose 74. Air inlet openings 404 extend through the lid 402 of the canister 400 so that ambient air can operate on the liquid 284 to force the liquid into the probe 276 and through the supply conduit assembly 274 in response to an aspiration effect created, as previously described, in the nozzle 212.

A media supply system includes a media supply conduit assembly 508 that connects with a street ell-type of fitting 510 to the body 290 of the nozzle 212. No valve need be provided in the media supply conduit 508 unless the apparatus 210 is to be utilized in applications where liquid will occasionally be substituted for granular media to utilize the apparatus 210 to mix and apply liquids from the canisters 400, 500. The probe 230 is identical to the previously described probe 30 and is positioned inside the canister 500 to draw a mixture of carrier gas and media (or a substituted liquid) from within the canister 500 for delivery to the supply conduit assembly 508. The probe 230 is mounted within the canister 500 in a manner which is described in detail in the referenced Canister Probe Case. The probe 230 operates identically to that of the earlier described probe 30 except that the supply of carrier gas, namely ambient air, which enters the probe 230 through its open upper end 256 is drawn through holes 504 formed in a cap 502 of the canister 500.

While the embodiment of FIGS. 8 and 9 is shown employing dual canisters 400, 500, one or both of the canisters 400, 500 may be replaced by their corresponding remote reservoirs 24, 78 and connected to the nozzle assembly 212 by the previously described supply hoses 20, 74. Stated in another way, the remote reservoirs 20, 74 may be used to supply a selected one of the media and liquid materials to the nozzle 212, while one of the canisters 400, 500 is used to supply the other of these materials.

While the reservoir 78 and the canister 400 have been described as containing a liquid which is water, it will be understood by those skilled in the art that a wide variety of liquids may be utilized with the system of the present invention. By way of but one example, a lubricating liquid such as a light oil composition may be utilized in place of water so that as a metallic surface is being blasted by either of the apparatuses 10, 210, the surface is, at the same time, being coated with a protective film of lubricant to inhibit the onset of corrosion. Likewise, the apparatuses 10, 210 may be utilized to supply two or more controlled flows of liquids from separate reservoirs.

The relative orientations at which media and/or liquids are introduced into a mixing chamber of a discharge control nozzle has not been found to influence the operation of an apparatus embodying features of the present invention. Accordingly, while FIG. 7 depicts relative entry orientations for liquid and media into the mixing chamber 110 arranged at approximately 120° relative to each other, and while FIG. 9 depicts liquid and media entry orientations to the mixing chamber 310 arranged substantially along a common axis, alternate relative orientations for introducing media and/or liquids into a discharge control nozzle mixing chamber may be used.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed. It intended that the patent shall cover, by suitable expression in the appended claims, whatever features of patentable novelty exist in the invention disclosed.

What is claimed is:

1. A sand blast apparatus for discharging a mixture of flowable media, carrier gas, liquid and propulsion fluie in a controlled flow, comprising:
    (a) discharge nozzle means for connection to a source of pressurized propulsion fluid for establishing a flow through the nozzle means which generates an aspiration effect that is utilized for drawing a mixture of flowable media such as granular sand, a carrier gas such as ambient air, and a liquid such as water into the nozzle means, and for discharging from the nozzle means a uniform mixture of the flowable media and the liquid together with the propulsion fluid and carrier gas;
    (b) media supply means for ducting the flowable media from a media reservoir to the discharge nozzle means in response to the aspiration effect generated within the nozzle means, the media supply means including a media supply conduit and aspirator probe means connected to the media supply conduit for insertion into the media reservoir, the aspirator probe means comprising:
        (i) a first upstanding inside structure defining an elongate, upwardly extending generally tubular delivery passage, said delivery passage having an opening at its lower end to receive flowable media from the media reservoir when the aspirator probe means is inserted into media contained within the media reservoir;
        (ii) the first upstanding inside structure also having means at its upper end for facilitating connection of an inlet conduit thereto, and said delivery passage having an opening at its upper end for delivering a mixture of flowable material and carrier gas therefrom and into an inlet conduit connected to the first upstanding inside structure;
        (iii) a second upstanding outside structure substantially surrounding the first structure in non-coaxial relation thereto and attached at one side thereof, with the second structure of lesser height than the first structure;
        (iv) confronting walls of the non-coaxial first and second structures defining an elongate upwardly extending tubular gas supply passage which is open at its upper end to receive carrier gas and which extends alongside the delivery passage for ducting carrier gas from its upper end region to a location near the lower end region of the delivery passage; and,
        (v) communicating formation means located within the second structure and in proximity to the lower end of the first structure for communicating the delivery passage with the gas supply passage and for permitting a restricted flow of carrier gas to pass from the gas supply passage to the delivery passage under the influence of an aspiration effect created as flowable media is drawn from the media reservoir into and through the deliver passage past the communicating formation means; and, (c) liquid supply means for ducting a controlled flow of liquid from a liquid reservoir to the discharge nozzle means in response to the aspiration effect generated within the nozzle means.

2. The apparatus of claim 1 wherein the delivery and supply passages of the probe means are defined by separate first and second elongate tubes of unequal diameter and unequal length, with the first tube being configured for connection to the media supply conduit and extending at least partially through the second tube.

3. The apparatus of claim 2 wherein the communicating formation means is provided by lower ends of the first and second tubes which extend within separate planes, with at least a portion of the lower end of the first tube extending within the confines of the lower end of the second tube.

4. The apparatus of claim 3 wherein the separate planes of the ends of the first and second tubes of the probe means extend parallel to each other.

5. The apparatus of claim 1 wherein the liquid supply means includes flow regulator means for selectively controlling the rate of flow of liquid which enters the nozzle means.

6. The apparatus of claim 1 wherein the liquid supply means includes a probe for insertion into the liquid reservoir for ducting liquid through the probe and into a liquid supply conduit in response to the aspiration effect generated within the nozzle means.

7. The apparatus of claim 1 wherein the discharge nozzle means includes a mixing chamber into which the media, the carrier gas and the liquid are ducted and mixed for discharge with the propulsion fluid.

8. The apparatus of claim 1 wherein the media reservoir is located remotely from the discharge nozzle means, and the media supply conduit includes a flexible hose.

9. The apparatus of claim 1 wherein the media reservoir includes a canister located in relatively close proximity to the discharge nozzle means and connected by the media supply conduit to the discharge nozzle means.

10. The apparatus of claim 1 wherein the liquid reservoir is located remotely from the discharge nozzle means, and the liquid supply means includes a flexible hose.

11. The apparatus of claim 1 wherein the liquid supply reservoir includes a canister located in relatively close proximity to the discharge nozzle means, and the liquid supply means includes conduit means connecting the canister to the discharge nozzle means.

12. A sand blast apparatus, comprising:

(a) discharge nozzle means for connection to a source of pressurized propulsion fluid for establishing a flow through the nozzle means which generates an aspiration effect that is utilized for drawing a mixture of flowable media and a carrier gas into a mixing chamber defined within the nozzle means, and for discharging the media and the liquid from the nozzle means together with the carrier gas and propulsion fluid;

(b) media supply means for ducting flowable media from media reservoir to the discharge nozzle means in response to the aspiration effect generated within the nozzle means, wherein the media supply means includes a media supply hose connected at one of its ends to the nozzle means to deliver media and carrier gas into the mixing chamber, and media aspirator probe means connected to the other end of the media supply hose for insertion into the media reservoir of flowable material, the media aspirator probe means comprising:

(i) structure defining a delivery tube and a gas supply tube arranged one within the other in non-coaxial and eccentric relation, with the delivery tube defining an upwardly-extending delivery passage and being of smaller diameter than the gas supply tube, and with the gas supply tube surrounding the delivery tube along a majority of the length of the deliver tube and cooperating with portions of the delivery tube to define an elongate, upwardly extending gas supply passage which is open at its upper end to receive carrier gas;

(ii) the structure additionally defining communicating formation means for communicating the delivery passage with the gas supply passage for establishing an aspiration effect to draw carrier gas from the gas supply passage to the delivery passage as material flowing in a direction established by the delivery passage passes by the formation means; and, (c) liquid supply means for ducting a controlled flow of liquid from a liquid reservoir to the mixing chamber in response to the aspiration effect generated within the nozzle means.

13. The apparatus of claim 12 wherein the delivery and supply passages of the probe means are defined by separate first and second elongate tubes of unequal diameter and unequal length, with the first tube being configured for connection to the inlet conduit and extending at least partially through the second tube.

14. The apparatus of claim 13 wherein the communicating formation means of the probe means is provided by lower ends of the first and second tubes which extend within separate planes, with at least a portion of the lower end of the first tube extending within the confines of the lower end of the second tube.

15. The apparatus of claim 14 wherein the separate planes of the ends of the first and second tubes of the probe means extend parallel to each other.

16. The apparatus of claim 12 wherein the second delivery means includes flow regulator means for selectively controlling the rate of flow of liquid which enters the mixing chamber.

17. The apparatus of claim 12 wherein the media reservoir is located remotely from the discharge nozzle means, and the media supply conduit includes a flexible hose.

18. The apparatus of claim 12 wherein the media reservoir includes a canister located in relatively close proximity to the discharge nozzle means and connected by the media supply conduit to the discharge nozzle means.

19. The apparatus of claim 12 wherein the liquid reservoir is located remotely from the discharge nozzle means, and the liquid supply means includes a flexible hose.

20. The apparatus of claim 12 wherein the liquid supply reservoir includes a canister located in relatively close proximity to the discharge nozzle means, and the liquid supply means includes conduit means connecting the canister to the discharge nozzle means.

* * * * *